United States Patent Office 3,477,905
Patented Nov. 11, 1969

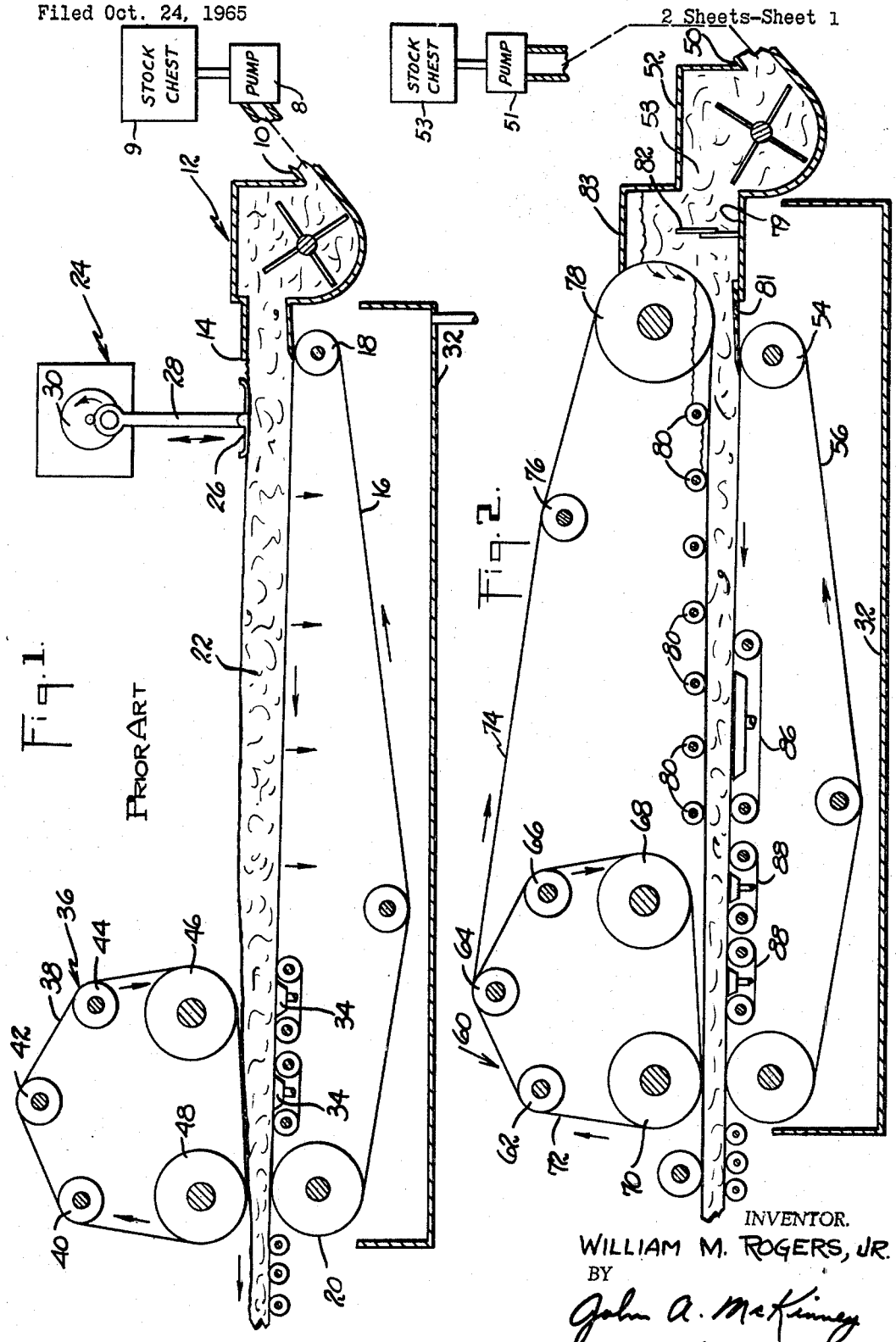

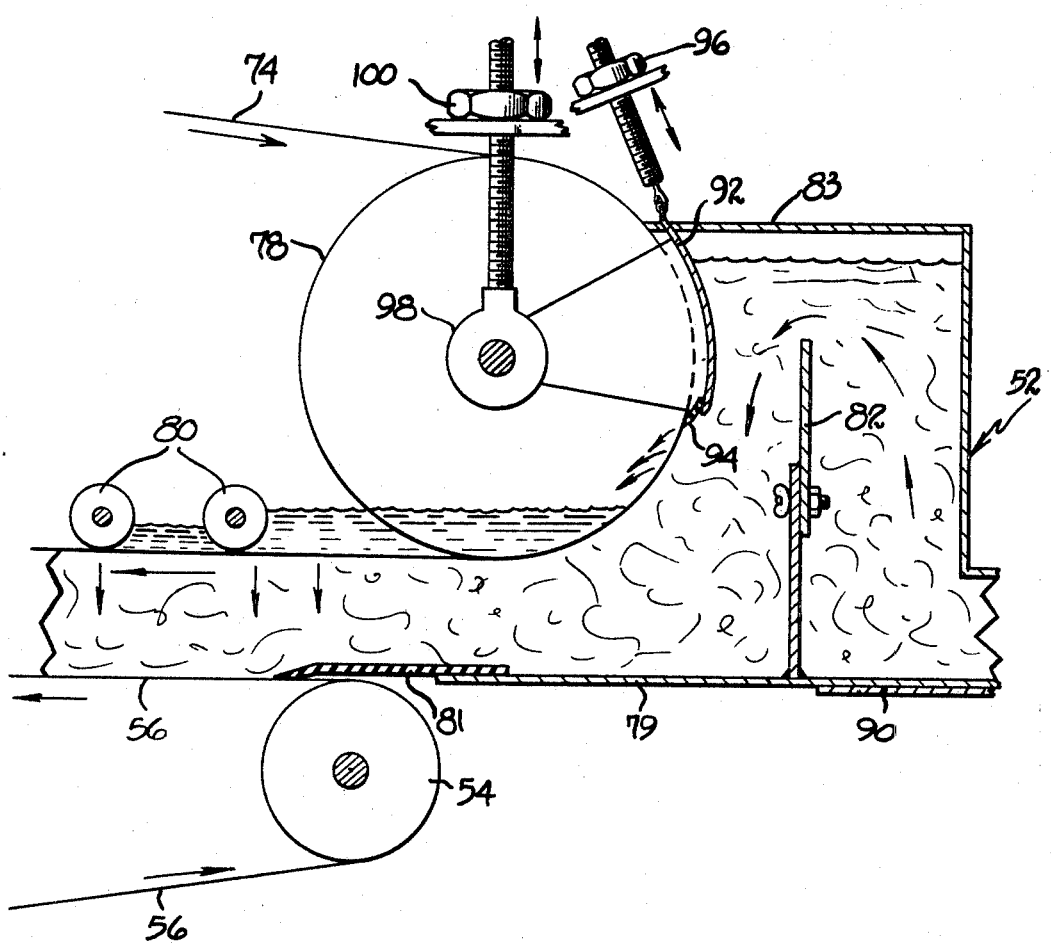

3,477,905
METHOD AND APPARATUS FOR MANUFACTURING FELTED FIBROUS PRODUCTS
William M. Rogers, Jr., Ardsley, N.Y., assignor to Johns-Manville Corporation, New York, N.Y., a corporation of New York
Filed Oct. 24, 1965, Ser. No. 504,513
Int. Cl. D21f *11/02*
U.S. Cl. 162—203                    5 Claims

ABSTRACT OF THE DISCLOSURE

In a two-wire Fourdrinier board forming process slurry water passing through the lower surface of the upper screen is permitted to drain back through the mat formed on the under surface of the screen, thus increasing the solids content of the mat and making its structure more uniform.

---

This invention relates to the manufacture of felted fibrous products by a free draining continuous manufacturing operation such as that provided by a Fourdrinier machine. More particularly, it relates to the manufacture of felted fibrous products on such a machine provided with a continuously moving upper screen spaced above and moving parallel to the usual continuously moving bottom screen.

In the usual manufacture of fibrous products on a Fourdrinier machine an aqueous slurry containing the fibrous material is deposited on a moving wire screen, commonly called the "Fourdrinier wire," and the solids in the slurry form a mat on the upper surface of the wire as the water in the slurry drains downwardly through the screen by gravity and by suction. After being compacted by a press to the desired thickness, the mat is dried in a heated drier oven and subsequently is subject to finishing operations, such as, for example, planing, sanding, trimming and coating operations. The planing and/or sanding operations usually are required because while the bottom side of the resulting board, which had been incontact with the top of the screen, is relatively smooth the other side is rough and generally not suitable for use in that condition. In addition, the smoother bottom surface often is marred to some degree by foreign materials, damage caused by processing and handling, and by heavier particles in the slurry which tend to settle to the bottom of the slurry layer when the slurry is deposited on the screen. This is especially true in the manufacture of felted mineral wool products since mineral wool usually contains many unfiberized particles, called "shot," which settle to the screen rapidly and remain at or adjacent the surface of the board which had been in contact with the screen during formation of the board.

It would be highly desirable if fibrous boards could be manufactured on a continuous process machine so that the top surface of the resulting board is smooth enough not to require any further smoothing operations, thus eliminating a time-consuming and expensive processing step as well as avoiding the waste of material removed from the board by such an operation.

It is an object of the present invention to provide a process for manufacturing a fibrous board on a continuous process machine, such as a Fourdrinier machine, which process will produce a board having relatively smooth surfaces which do not require to be smoothed further.

Another object of the invention is to provide a process for manufacturing a fibrous board to its final thickness, thereby eliminating subsequent planing or other thickness reducing operations.

Another object is to provide a process for manufacturing a board, such as that described above, on continuous process equipment which can be obtained by modifying existing equipment in a simple, inexpensive manner.

Briefly, the foregoing objects are achieved by providing the basic Fourdrinier type of machine with an endless screen or wire located above the usual Fourdrinier wire and continuously moving in the direction of the flow of stock, or, in other words, parallel to the movement of the bottom wire. The slurry is brought into contact with, and made to form a fibrous mat on, the underside of the upper wire before the slurry contacts and forms a fibrous mat on the upper surface of the bottom wire, so that both surfaces of the board resulting from the combined mats will have been formed on a screen and will be relatively smooth. By the process of the present invention the water of the aqueous slurry is caused to move through the top wire and, after solids from the slurry have begun to form a mat on the underside of the top wire the slurry water is permitted to drain back through the material between the top and bottom wires. This causes some of the materials which had passed through the top wire in the water and which had not been trapped in the mat on the under surface of the wire to be filtered out as the water passes down through the mat and to remain in the mat. This double filtration action, resulting from the slurry water twice passing through the material between the top and bottom wires, provides several unexpected benefits which will be discussed in more detail hereinafter.

The nature of the invention will be more fully understood and other objects may become apparent when the following description is considered in connection with the accompanying drawing wherein:

FIG. 1 is a diagrammatical side elevational view, shown partially in section, of the first portion of a typical Fourdrinier manufacturing line of the prior art;

FIG. 2 is a view similar to that of FIG. 1, but showing an embodiment of the present invention; and FIG. 3 is an enlarged longitudinal sectional view of the apparatus of the present invention at the headbox area of the manufacturing line.

Referring to the drawing, FIG. 1 shows a typical Fourdrinier machine of the prior art method of forming a felted fibrous board. An aqueous slurry containing the fibrous particles is mixed together and pumped by pump 8 from the stock chest containing the slurry through conduit 10 to the headbox 12.

It then flows from the outlet 14 of the headbox onto the moving Fourdrinier wire 16, which is trained about the breast roll 18 and roll 20. The slurry is deposited in the form of a layer or pool 22 on the moving Fourdrinier wire, and a puddling apparatus 24, comprising a tamping plate 26 connected to a rod 28 which is reciprocably moved by an eccentric 30, tamps or puddles the slurry to initially consolidate the material. As the material in the layer 22 is moved forward by the Fourdrinier wire, water in the slurry drains downwardly through the wire to a drainage pit 32. After the mat has been consolidated to a fairly stable condition it may be passed over suction devices, such as those indicated at 34, to assist in removing water from the material. A further substantial consolidation of the layer of mat 22 occurs at the press section 36, which comprises a continuously moving screen 38 trained about a number of upper rolls 40, 42 and 44 and lower rolls 46 and 48. As shown in the drawing, the layer of material 22 is reduced in thickness substantially by the press section 36. After leaving the press section the consolidated mat continues toward the drying and planing stations.

There is still a substantial amount of water in the mat, which varies depending on the type of board being made but perhaps being in the order of about 60% of the total weight of the mat as it leaves the press section, and substantially all of this must be removed in the drier. The top surface of the board as it enters the drier is somewhat compacted due to the action of the press section 36, but it is still relatively rough and not as smooth as the bottom surface of the board, which had been in contact with the Fourdrinier wire 16. After the board has been dried it generally is planed or sanded to smooth the surface, this operation removing about 1/16 inch of material.

The process of the present invention can be carried out by the apparatus illustrated in FIG. 2, which shows a conduit 50 leading from a pump 51 connected to the stock chest 53 containing the fibrous slurry to a head box 52 having an outlet portion 53 just above the breast roll 54 of the lower Fourdrinier wire 56. The Fourdrinier wire 56 also is trained about roll 58 and moves in the same manner as the wire 16 described in connection with FIG. 1. The apparatus of FIG. 2 also includes a rotary press section 60 comprising upper rolls 62, 64, and 66 and 68 and 70, about which a screen 72 is trained for rotation in the direction of the arrows. This press section is similar to the rotary press section 36 of the apparatus shown in FIG. 1.

Also trained about the rolls 70, 62 and 64 of the rotary press section 60 is a continuous screen 74 similar to the Fourdrinier wire 56. The wire 74 passes over an idler roll 76 and is trained about a hollow drum 78, after which it moves horizontally beneath a series of opposition rolls 80 toward the rotary press section 60. Preferably, the hollow drum is located upstream from the breast roll 54, and drainage of water from the slurry and from the material formed on the top wire is prevented, by an extension 79 of the bottom wall of the head box 52 and by gasket 81, provided between extension 79 and roll 54, from occurring before solids from the slurry have formed a mat on the upper Fourdrinier wire, said draining being prevented until a location is reached downstream from the point at which the mat is formed on the bottom side of the upper screen. If the breast roll of the bottom Fourdrinier wire is located upstream from the hollow drum, as it may be if existing equipment is modified, it is necessary to cover the bottom Fourdrinier wire with a plate to prevent drainage from the slurry before formation of a mat on the upper wire.

Located in an upward extension 83 of the headbox 52 a short distance downstream from the outlet portion 53 of the head box is a vertical baffle plate 82 over which the slurry must flow in order to reach the Fourdrinier wires. The upward flow of the slurry as it moves over the baffle causes any heavier particles therein to tend to settle out, thus eliminating one of the causes of damage to or marring of the bottom surface of a board manufactured on the apparatus.

Referring to FIGS. 2 and 3, in the operation of the apparatus, slurry from the head box 52 flows over the baffle plate 82 and comes in contact first with the screen or Fourdrinier wire 74, trained about the hollow drum 78. The pressure head of the slurry in the extension portion 83 of the head box 52 causes the water in the slurry to flow through the screen 74 and into the hollow drum 78; in so doing, fibrous and other solid particles in the slurry are caught on the screen or wire 74 and remain there to form a fibrous mat. The top surface of the resulting board, instead of being rough, as it normally would be in the usual Fourdrinier operation, is relatively smooth, as in the case of the bottom of the board formed on the usual type of Fourdrinier machine. Water in the slurry is prevented by extension 79 and gasket 81 from draining through the bottom wire 56 before the slurry particles have had an opportunity to form a mat on the top wire 74. When the slurry reaches the bottom wire 56 as it leaves the breast roll 54, free drainage is permitted and water drains from slurry through wire 56 and down to the drainage pit 32, solid particles from the slurry forming a mat on the bottom wire during the process. Since this permits the water resting on the upper surface of the top wire to filter back through the material, thus trapping in the combined mat solids contained in the water which previously had passed through the top wire during the initial formation of the upper portion of the combined mat, many of the very fine particles and more of the binder material contained in the slurry are trapped in the mat and have become part of its structure. The top wire 74 is kept in flat condition and always in contact with the mat surface by the opposition rolls 80. If desired, vacuum equipment such as that illustrated at 86 can be provided in addition to the vacuum apparatus 88 to aid in the drainage.

Referring to FIG. 3, the operation of the apparatus can be visualized in greater detail. The baffle plate 82 can be made adjustable, as shown by the two separate plates comprising the baffle, in order to vary the height of the pressure head in the extension portion 83 of the head box 52. By varying the height of the pressure head the degree of tendency of the slurry to flow into the hollow drum can be changed. As indicated previously, the baffle plate 82 also provides the function of causing the heavier particles in a slurry, such as the unfiberized particles of mineral wool in a fibrous slurry used for the manufacture of felted mineral wool board, to settle out, thus eliminating another factor which contributes to an undesirable board surface. If the equipment is used for manufacture of boards made from such slurries, it is expedient to provide the bottom wall of the head box 52 with a removable plate 90 to permit the head box to be cleaned periodically to remove the accumulation of heavy particles.

Between the hollow drum 78 and the slurry in the head box extension portion 83 is a slide gate 92 which is provided at its lower extremity with a gasket 94 contacting the rotating drum and connected to an adjusting device, such as that indicated by the screw means 96. By adjusting the gate upwardly or downwardly the total amount of area of the screen on which a mat can be formed is controlled. The rotating hollow drum 78 is mounted in bearings 98 which themselves are adjustable vertically by means of threaded adjusting means 100 in order to adjust the distance the drum is spaced from the plane of the bottom wire 56, thereby controlling the thickness of the mat to be formed. Gaskets (not shown for the sake of simplicity, but well known in the art) can be provided at the ends of the hollow drum to prevent the flow of slurry between the drum and the sides of the machine.

The "top wire" process of the present invention for manufacturing felted fibrous products provides a number of advantages. First, by forming the stock on the top wire the upper surface of the resulting board needs no further smoothing operations, such as planing or sanding. Thus the board may be made to its desired thickness immediately instead of making it about 1/16 inch or more thicker and then removing the excess material from the top surface, and at times, from both surfaces. This provides a substantial savings in material and time of manufacture. The more uniform surfaces also provide for increased efficiency of the coating operation because the coating rollers are able to contact all of the board surface with greater ease.

The time of manufacture of the overall process is also reduced because the mat is formed or consolidated on the top wire almost as soon as the wire leaves the top forming drum 78, and shortly thereafter the mat is formed on the bottom wire. The amount of available surface in which the mat can be formed thus is greater than in the normal Fourdrinier process and increases the rate of board formation.

One advantage which was unexpected, and which may only be theorized about at present, is the higher solids content of the board produced by the present method. Perhaps this is due to the presence of the top wire 74 against the top surface of the mat, which may act somewhat as a cover and increase the effectiveness of the suction devices beneath the bottom wire, thus drawing out more water than it would if the top wire were not present. Whatever the reason may be, the fact is that mineral wool board made by the process of the present invention has had a solids content of about 44%, by weight, at the time it leaves the press section, whereas similar boards manufactured by the prior art method have only contained about 35%–37% solids. This reduction of moisture in the board increases the efficiency of the drying oven and allows the speed of the entire operation to be increased, thus greatly affecting the economics of the process.

Another advantage found to exist by using the process of the present invention is the uniformity of the board formation. In the prior art process using the Fourdrinier machine, the materials tend to settle more to the bottom of the board than the top due to the downward flow of water during drainage, which carries with it some of the solids, causing the board to have a gradient of materials and density. This gradient is particularly noticeable in the greater concentration of binder material at the bottom of a board than at the top since this has a direct effect on the hardness of the board surface. Also, when additional chemicals, such as fire-resistant salts, are added, they too may tend to migrate toward the bottom surface, leaving the opposite surface less protected. By forming a board according to the present invention, the slurry water, which originally had drained into the hollow drum through the top Fourdrinier wire, flows back through the formed mat once gravity drainage is permitted and, as previously mentioned, in so flowing, many of the solids which had not previously been trapped in the mat become trapped. It is believed that this is a major reason why the formation of the board is extremely uniform and not stratified, as in the case of boards manufactured on the usual type of Fourdrinier apparatus. Furthermore, by not removing the "skin" from the upper surface of the resulting board, due to the ability to make the board to final thickness immediately both surfaces can retain the skin and the hardness it possesses.

In order to compare the physical properties of fibrous boards made by both the usual type of Fourdrinier operation and by the top wire formation of the present invention, boards of the following formulation, by weight, were manufactured by both methods:

|   | Percent |
|---|---|
| Mineral wool | 77.2 |
| Starch | 8.1 |
| Clay | 9.6 |
| Newsprint fibers | 5.1 |
| Total | 100.0 |

In mixing the ingredients, cooked starch of 5% solids content, was added to an aqueous slurry of repulped newsprint fibers, the slurry also containing a small amount of sizing material. The clay was then added and enough water was provided to adjust the final consistency of the slurry to about 5.0%, after which the mineral wool fibers were introduced.

This slurry was used to manufacture boards by both methods and in each case the boards were dried to about 99% solids content in the drier. The following physical properties were noted for each of the boards:

|   | Top Wire Formation Board | Bottom Wire Formation Board |
|---|---|---|
| Thickness (in.) | 0.690 | 0.687 |
| Density (pfc) | 22.9 | 22.4 |
| Modulus of Rupture (p.s.i.): |   |   |
| Lengthwise | 221 | 241 |
| Crosswise | 307 | 272 |
| Water absorption 2 hr. (percent by Vol.) | 6.2 | 5.1 |
| Hardness BHN×1000: |   |   |
| Top Side | 75.4 | 63.7 |
| Screen Side | 74.5 | 76.5 |
| Laminar (p.s.i.) | 24 | 27 |
| Burnout (percent): |   |   |
| Top Third | 13.9 | 13.0 |
| Middle Third | 13.6 | 13.8 |
| Bottom Third | 13.7 | 14.6 |
| Complete Sample | 13.5 | 13.8 |
| Starch Retention (percent by weight): |   |   |
| Top Third | 9.6 | 7.5 |
| Middle Third | 8.2 | 8.1 |
| Bottom Third | 8.9 | 9.5 |
| Complete Sample | 8.8 | 8.0 |
| Solids to Drier (percent by weight) | 43.2 | 40.7 |

It should be noted that although the boards were substantially identical as far as their physical properties are concerned the hardness of the top surface of the board formed by the present invention was substantially greater than the hardness of the corresponding surface of the board manufactured by the usual Fourdrinier process, which indicates, along with the data on the burnout and starch retention, that more starch was contained in the top third of the board, and particularly, adjacent the upper surface of the board, than in the board manufactured by the usual Fourdrinier method. Also, the board formed by the present invention had a higher solids content than did the other board, so that the drier had less water to remove.

In summary, the present invention provides smooth surfaces on both the top and bottom sides of fiberboards manufactured by the modified Fourdrinier process disclosed herein, and permits a savings in material because there is no planing or sanding operation necessary. Further, the solids content of the board as it enters the drier is greater than that of similar boards made by the usual method on a Fourdrinier machine, thereby providing for greater drier efficiency and faster operating speeds, with the attendant savings in cost. The formation of the board is more uniform than the formation of board manufactured by the prior art method, which is especially significant since the top surface of the board, which previously had had a deficiency of certain materials, such as binder, and thus caused the surface exposed to the interior of the room in which it was installed to be softer than the opposite-back surface, now is as hard and tough as the opposite surface and better able to withstand rough treatment during installation. Because the initial formation of a fibrous board no longer is dependent upon the free drainage of the slurry water through the bottom Fourdrinier wire but actually takes place within a very short period of time on the top wire before free drainage begins, the speed of the machine can be increased substantially.

Although the invention has been described mainly with respect to mineral wood fibrous boards, other fibrous materials can be incorporated in a flowable aqueous slurry and be formed into a board by the process of the present invention. Such boards would include, but are not limited to, compositions containing mineral wool fibers, cellulosic fibers, glass fibers and asbestos fibers, and varying amounts of filler materials also can be incorporated in the composition, depending upon the type of board desired to be made.

The structure of the machine need not be limited to the specific structure described in connection with FIGS. 2 and 3. For example, the top wire ned not be trained about the rotary press section but may be trained about other rolls which are positioned upstream of the rotary press section, leaving the rotary press section as it normally is.

What I claim is:

1. In a process of manufacturing fibrous boards on a Fourdrinier machine having a slurry outlet and a continuously moving, generally horizontally disposed first screen, on the upper surface of which screen solids of the slurry are supported and through which screen slurry water can drain, the steps of
   (a) continuously moving a generally horizontal disposed second screen adjacent the outlet of the slurry, the second screen being located a distance above the first screen corresponding to the thickness of a mat to be formed from the slurry solids,
   (b) flowing a first portion of the slurry into contact with the undersurface of the second screen prior to contacting the first screen with the slurry to cause slurry water from the first portion to pass upwardly through the second screen and solids from the first portion to adhere to and form a mat on the undersurface of the second screen,
   (c) flowing the remaining portion of the slurry into contact with the upper surface of the first screen to cause slurry water from the remaining portion to drain downwardly through the first screen and solids from the remaining portion to adhere to and form a mat on the upper surface of the first screen whereby an integral mat of solids is produced between the first and second screens, and
   (d) draining the slurry water which had passed upwardly through the second screen, downwardly through the mat of solids whereby said slurry water in general passes twice through a mat of solids.

2. Apparatus for manufacturing fibrous boards comprising
   (a) a continuously movable substantially horizontally disposed bottom screen,
   (b) a continuously movable substantially horizontally disposed upper screen spaced a relatively short distance above the bottom screen,
   (c) slurry outlet means adjacent the upstream ends of the continuously movable screens,
   (d) means for flowing an aqueous fibrous slurry through the outlet means,
   (e) means for causing a first portion of the slurry to contact the bottom side of the upper screen and to cause the remaining portion of the slurry to subsequently contact the upper side of the bottom screen, whereby a mat of solids is formed first on the bottom side of the upper screen and next on the upper side of the bottom screen, both such mats combining to form a single integral mat of solids, and
   (f) means for preventing the slurry water which passes upwardly through the upper screen from draining downwardly through the mat and through the bottom screen until said slurry water is at a location downstream from the point at which the mat is formed on the bottom side of the upper screen.

3. A process of manufacturing fibrous boards as recited in claim 1, wherein the aqueous slurry contains fibers and binder, both of which are included in the solids that form the mat.

4. Apparatus for manufacturing fibrous boards as recited in claim 2, wherein the means for flowing an aqueous fibrous slurry into contact with the upper screen includes a baffle plate adjacent the outlet means over which the slurry is forced to flow, the upper edge of the baffle plate being higher than the uppermost point of the upper screen which the slurry contacts.

5. Apparatus for manufacturing fibrous boards as recited in claim 2, wherein the means for flowing an aqueous fibrous slurry into contact with the upper screen to cause slurry water to pass therethrough includes a hollow continuous rotatable drum about which the upstream end of the upper screen is trained.

References Cited
UNITED STATES PATENTS

| | | | |
|---|---|---|---|
| 2,911,039 | 11/1959 | Horn Bostel et al. | 162—303 |
| 3,262,841 | 7/1966 | Embry | 162—301 |
| 3,357,880 | 12/1967 | Curtis | 162—344 |
| 1,707,375 | 4/1929 | Upson | 162—301 |

S. LEON BASHORE, Primary Examiner

JOHN H. HARMAN, Assistant Examiner

U.S. Cl. X.R.

162—301, 305, 328, 336